(12) United States Patent
Pearce

(10) Patent No.: US 7,713,071 B2
(45) Date of Patent: May 11, 2010

(54) ELECTRICAL EARTHING NUT

(75) Inventor: Richard Henry Pearce, 8 Wroxham Way, Bognor Regis, West Sussex (GB) PO22 8EJ

(73) Assignee: Richard Henry Pearce (GB)

( * ) Notice: Subject to any disclaimer, the term of this patent is extended or adjusted under 35 U.S.C. 154(b) by 0 days.

(21) Appl. No.: 11/660,264

(22) PCT Filed: Aug. 19, 2005

(86) PCT No.: PCT/GB2005/003246

§ 371 (c)(1),
(2), (4) Date: Feb. 16, 2007

(87) PCT Pub. No.: WO2006/018653

PCT Pub. Date: Feb. 23, 2006

(65) Prior Publication Data

US 2007/0254535 A1    Nov. 1, 2007

(30) Foreign Application Priority Data

Aug. 19, 2004 (GB) ................................ 0418497.4

(51) Int. Cl.
*H01R 13/648* (2006.01)
(52) U.S. Cl. ........................................................ 439/97
(58) Field of Classification Search .................. 439/95, 439/96, 91, 92, 97
See application file for complete search history.

(56) References Cited

U.S. PATENT DOCUMENTS

| 1,340,602 A | 2/1920 | Evans |
| 4,189,198 A | 2/1980 | Reichman |
| 4,223,179 A * | 9/1980 | Lusk et al. ................. 174/73.1 |
| 4,623,205 A * | 11/1986 | Barron ........................ 439/96 |
| 4,693,542 A * | 9/1987 | Heng et al. ................. 439/626 |
| 4,806,108 A | 2/1989 | Meinhardt |
| 4,954,084 A * | 9/1990 | Pugh et al. ..................... 439/29 |
| 6,142,836 A * | 11/2000 | Deckmann et al. .......... 439/801 |
| 6,428,354 B1 * | 8/2002 | Meyer et al. ................. 439/551 |
| 6,783,377 B2 * | 8/2004 | Aoyama ....................... 439/92 |
| 7,056,161 B2 * | 6/2006 | Delcourt et al. ............. 439/766 |
| 2001/0026745 A1 | 10/2001 | Ostling |
| 2005/0077725 A1 | 4/2005 | Bartholoma |

FOREIGN PATENT DOCUMENTS

GB    1561946    12/1977

* cited by examiner

*Primary Examiner*—Neil Abrams
*Assistant Examiner*—Phuong Nguyen
(74) *Attorney, Agent, or Firm*—William H. Bollman

(57) ABSTRACT

The invention relates to an electrical earthing nut (1). In the past these have sometimes vibrated loose, with the result that a failsafe safety device has been rendered inoperable. The invention overcomes this problem by providing a nut (1) that has a nut body (2) having an internal thread (4) to receive a threaded shaft and an external perimeter shaped to receive a tensioning device such as a spanner. Body (2) has opposing generally planar faces 5,6. Threaded apertures (7A, 7B, 7C) are p nut body to receive a bolt (8A) to secure an earth connector (8B) to the nut body (2) and grub screws (8C, 8D). F 9B, 9C, 9D) are provided on planar face (5) to scrape or cut into a surface against which the nut is to abut. Earthing used with a cable gland.

10 Claims, 4 Drawing Sheets

ELECTRICAL EARTHING NUT

BACKGROUND

The present invention relates to an electrical earthing nut.

When connecting an electrical junction box or appliance to a steel wire armoured (SWA) electrical cable, it is common practice to use a SWA cable gland. Such glands have a compression fitting on one side (which is exposed) to physically clamp the steel armour wires, and a threaded shaft, which passes through the wall of a junction box or appliance. A nut is secured on the end of the threaded shaft to secure the gland to the box or appliance wall.

In order to comply with safety regulations in many jurisdictions it is necessary to earth at least one end of the cable. To achieve this, a particular type of washer—known as "banjo washer"—is placed under the nut, and a bolt is then drilled through a hole in the arm of the washer to receive an earth wire employing a crimped connector. Also the arm is usually bolted through the box or appliance wall.

PRIOR ART

However, the aforementioned banjo washers have suffered from a number of disadvantages.

Firstly the arm can break if bent away from the box or appliance wall. This has resulted in a disconnection of the gland from the earth connection. This was dangerous and could result in an earth fault.

Secondly, if the gland became loose, the connection between the washer and the gland degraded to a poor connection, which caused a high resistance path to earth.

Thirdly often the box or appliance wall was made of a synthetic plastics material and this sometimes distorted, causing the connection between the washer and the gland to become poor, again resulting in a high resistance path to earth.

Fourthly the task of drilling a hole in the appliance or box wall was time consuming and fiddly, particularly where there was poor or limited access, and a separate nut and bolt was required for the earth connection.

An object of the invention is therefore to provide an earthing nut which overcomes the aforementioned disadvantages.

Another object of the invention is to provide an earthing nut which can replace the existing combination of a nut and banjo washer on SWA cable glands.

A further object of the invention is to provide an earthing nut which can be used in other existing electrical installations, such as other metal cable glands and electrical conduits, and may be retrofitted into such electrical installations.

SUMMARY OF THE INVENTION

According to a first aspect of the present invention there is provided an electrical earthing nut comprising:
a) a nut body having an internal thread and an external perimeter shaped to receive a tensioning device, such as a spanner, said nut body having opposing generally planar faces,
b) at least one threaded aperture on the nut body to receive a bolt to secure an earth connector to the nut body; and
c) at least one raised rib on one planar face to engage a surface against which the nut is to abut.

The or each raised rib is ideally dimensioned and arranged to scrape or cut the surface against which a planar face of the nut is to abut.

Preferably, the or each, threaded aperture extends into the nut body from a perimeter of the nut body.

In a yet further embodiment the nut may have a raised or extended annulus or flange defined around the rim or aperture defined on the or each planar surface of the nut.

Three apertures are ideally provided, one to receive a bolt and the other two for receiving grub screws to drive against, or bite into, a threaded shaft on which the nut is threaded.

Where more than one aperture is provided from a flat face of a perimeter, for example in the case of an hexagonal nut, the holes may be offset. An advantage of this is that it enables grub screws to be more readily fitted in applications where space is cramped.

Preferably at least three and preferably four (or more) raised projections or ribs are provided. These projections or ribs are ideally formed on a planar face of the nut.

Ideally the outer perimeter of the nut is generally circular with opposing flat portions to receive a spanner or wrench.

In an alternative embodiment of the invention the outer perimeter of the nut is polygonal or ideally hexagonal.

In a yet further embodiment the nut may have a raised or extended annulus or flange defined around the rim or aperture defined on the or each planar surface of the nut.

An advantage of the embodiment having the raised or extended annulus is that the nut is centralised in the event it is located in an oversize hole. This feature thus ensures the nut is held stationery, by way of an axial or compressive force, and does not vibrate. Vibration of connectors, particularly safety connectors is undesirable because contacts and connections may work loose, thus rendering the safety connector ineffective.

The invention also extends to an earthing nut as defined above in combination with cable gland.

It will be appreciated that the invention also extends to an earthing nut, as defined above, in combination with an electrically conductive cable.

According to another aspect of the invention there is provided a method of forming an electrical earthing nut comprising the steps of:
a) forming a nut body having an internal thread and an external perimeter shaped to receive a tensioning device, such as a spanner, said nut body having opposing generally planar faces;
b) forming at least one threaded aperture on the nut body to receive a bolt to secure an earth connector to the nut body; and
c) forming at least one raised rib on one planar face of the nut.

Methods of forming the nut include: stamping, swaging and forging.

It will be appreciated that this further aspect of the invention also extends to the other preferred features associated with the above mentioned aspects of the earthing nut.

Embodiments of the invention will now be described, by way of exemplary example, and with reference to the drawings in which:

DETAILED DESCRIPTION OF PREFERRED EMBODIMENTS OF THE INVENTION

Figure 1:
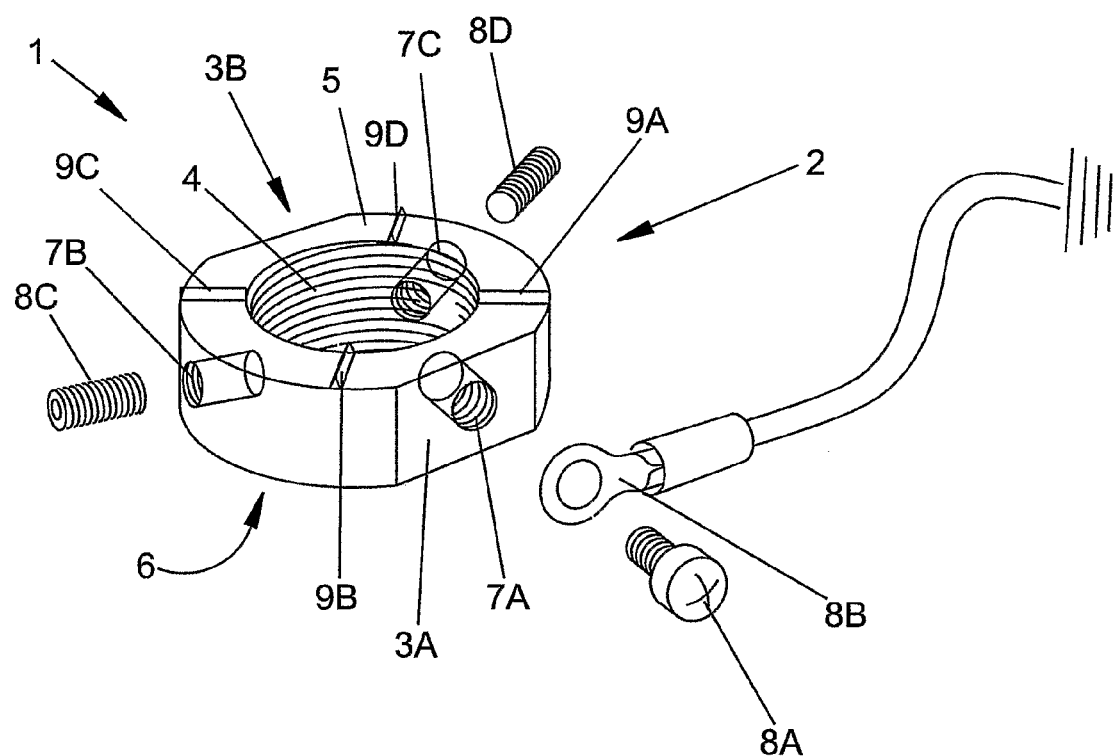
FIG. 1 shows a perspective view of a nut in accordance with one aspect of the invention.

Referring to FIG. 1 there is shown an electrical earthing nut 1.

Nut 1 has an annular nut body 2 with generally circular perimeter with opposing flat portions 3A, 3B to receive a spanner or other tensioning device. Nut body 2 has an internal thread 4 to receive a threaded shaft. Nut body 2 has opposing generally planar faces 5 and 6.

Three radially spaced threaded apertures 7A, 7B, 7C extend into the nut body 2 from the nut body perimeter. Aperture 7A receives a bolt 8A and earth connector 8B with a wire leading to earth. Apertures 7B, 7C (which may be located at any position around the perimeter of the nut) each receive grub screws 8C, 8D to engage with, or bite into, a threaded shaft (not shown) on which the nut 1 is placed.

Four raised ribs in the form of teeth 9A, 9B, 9C, 9D are provided on planar face 5 to scrape or cut into a surface against which the nut is to abut. The purpose of these ribs or teeth 9A, 9B, 9C, 9D is to Referring now to FIG. 2, there is shown a cable gland 10 to be fitted through an aperture 21 of a wall 20 of an electrical box or appliance (not shown) using the earthing nut 1. Cable gland 10 is of a type well known in the art having a threaded shaft 11 extending one side of a nut 12 and a compression base 13 which receives a compression nut 14.

In use, shaft 11 is passed through aperture 21 and secured to wall 20 by nut 1 of the invention on the other side of wall 20.

As nut 1 is tightened, so the teeth 9A, 9B, 9C, 9D scrape across and cut into the surface of wall 20. This has three advantages:

Firstly if the wall 20 is metal, paint thereon is scraped away so providing a good electrical connection between the nut 1 and the wall.

Secondly, the teeth prevent the nut from unwinding off shaft 11.

Thirdly, once tightened with the teeth engaged with the wall 20, the combined assembly of gland 10 and nut 1 can be tightened merely by rotating gland nut 12 with a spanner or wrench (not shown). That is, a separate spanner is not required to hold nut 1 whilst gland 10 is rotated.

Connector 8B is attached to nut body 2 by bolt 8A. This arrangement provides a more reliable mechanical and electrical connection to earth than was previously achieved with a banjo nut. Furthermore there is no longer any need for difficult drilling of a hole in the wall of a box or appliance.

Grub screws 8C, 8D engage with and bite into shaft 11 to help ensure the nut 1 stays in close contact with the shaft 11. Grub screws aid electrical contact if used on plastic enclosures or when terminating cables (not shown) where no enclosure wall is used.

It will be appreciated that nut 1 may be used in other electrical installations such as connecting electrical conduits into walls of domestic or industrial electrical boxes or appliances; connecting electrical leads to vibrating systems, such as engines; aeronautic or marine applications where good electrical connections and insulation are essential for safety; and oil field, chemical or petrochemical plants, where safety issues are also paramount.

The invention may take a form different to that specifically described. For example, the outer perimeter of the nut body 2 may be polygonal, hexagonal.

Nut 1 may be sold on its own or in combination with cable gland 10. The invention thus also extends to an earthing nut as defined above in combination with cable gland.

Figure 2:
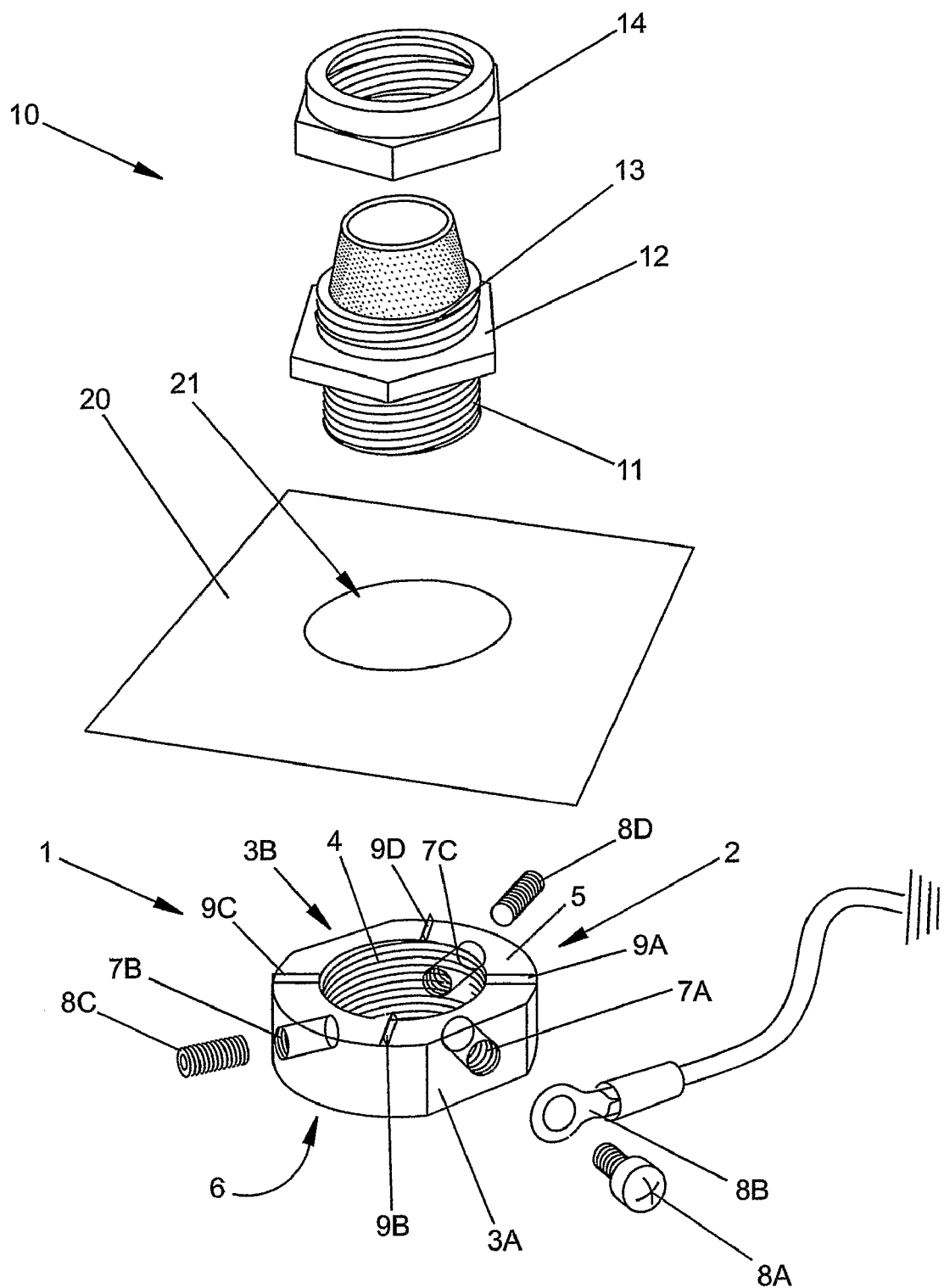
FIG. 2 shows an exploded perspective view of a cable gland and an embodiment of a nut in accordance with one aspect of the invention.
Figure 3C:
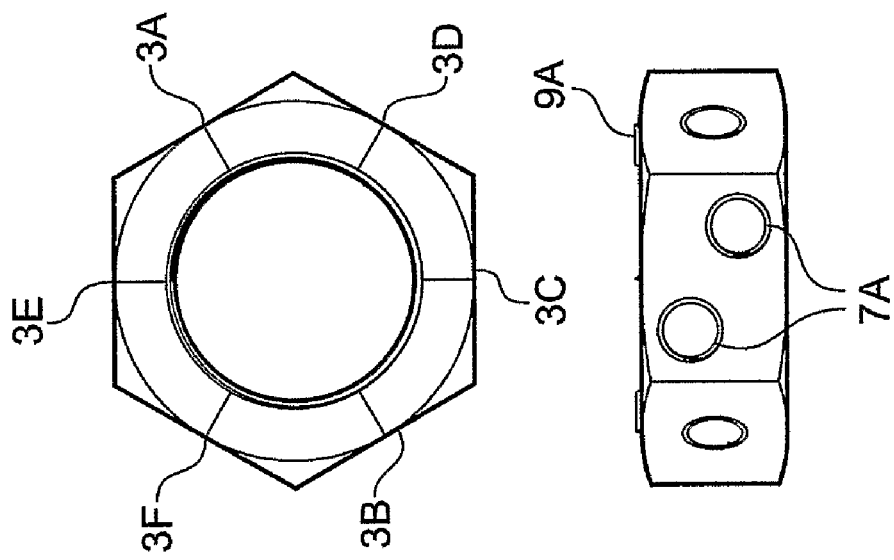
FIGS. 3a, 3b and 3c show plan and elevation views of three alternative embodiments of the invention.
Figure 3B:
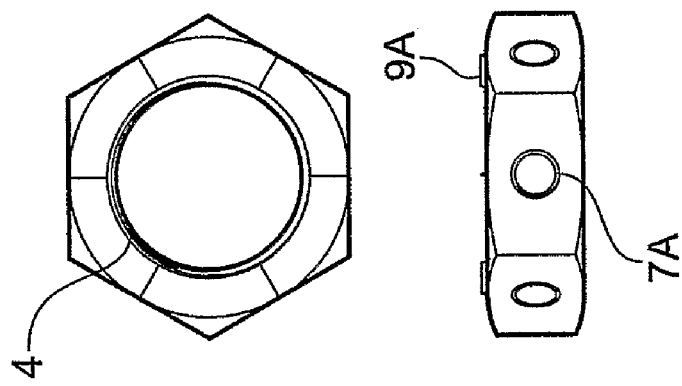
Figure 3A:
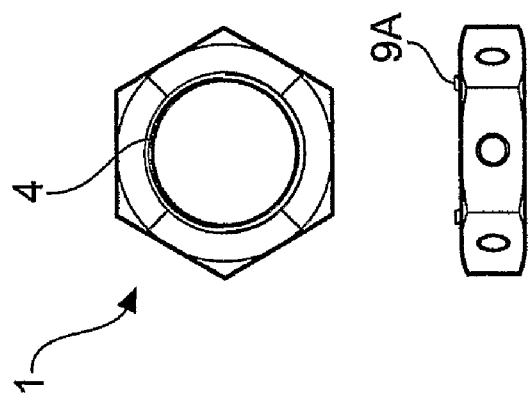

Referring briefly to FIGS. 3a, 3b and 3c which show plan and elevation views of three different sized nut 1 of an alternative embodiments of the invention, in which like parts bear the same reference numerals as in FIGS. 1 and 2. The nut shown in FIGS. 3a, 3b and 3c is in the form of a conventional hexagonal nut.

FIGS. 3a and 3b show different sizes of nut 1 having a single hole in three sides. The reason for forming a hole in three sides is so that when the nut 1 is tightened there will always be a side, facing an operator, with a hole presented for receiving the grub screw 8.

FIG. 3c shows a larger version of the nut 1 in which two holes 7A are formed in one of the faces. The holes 7A are offset so as to enable the nut to be readily used in areas of limited access or fitted in applications where space is cramped, thereby always ensuring a hole is accessible for receiving a grub screw.

The nuts in FIGS. 3a, 3b and 3c are illustrated as not having teeth. However, they may have teeth.

Figure 4:
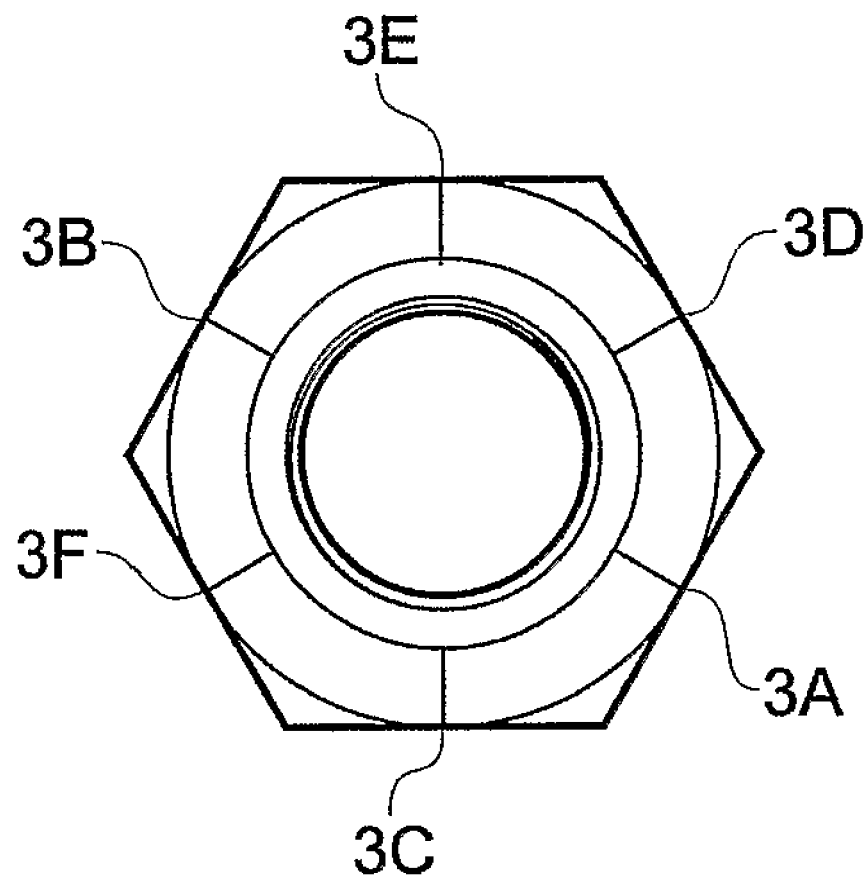
FIG. 4 shows plan and elevation view of a further alternative embodiment of the invention, which includes an annulus.
Figure 4:
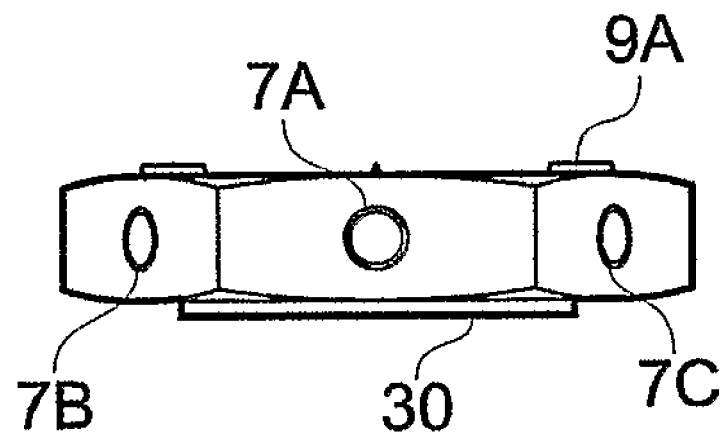

Referring briefly to the embodiment shown FIG. 4, in which like parts bear the same reference numerals, there is shown a nut 1 with a raised or extended annulus or flange 30 defined around the rim or aperture defined on the or each planar surface 5 or 6 of the nut 1. The raised or extended annulus 30, in use, ensures that the nut 1 is centralised in the event it is located in an oversize hole or location where it is prone to vibration (not shown).

Rim or annulus 30 therefore ensures the nut 1 is held stationery, by way of an axial or compressive force, and does not vibrate.

It will be understood that the dimensions of the nuts and the holes change to accommodate different cable sizes.

Ideally the nut is formed from a material with good mechanical and electrically conductive properties. Ideally a metal such as brass or steel is preferred, however, it is envisaged that composite materials may also be used for specialist applications.

Thus use of the invention overcomes the disadvantages with existing earthing nuts and thereby provides a more reliable earthing nut that does not suffer from existing drawbacks, is not prone to vibrating free once fitted; is simple to use and easily fitted.

Further modifications will be apparent to those skilled in the art without departing from the scope of the present invention.

The invention claimed is:

1. An electrical earthing nut comprising:
   an electrical earthing nut body having an internal thread, which in use received a threaded shaft, and an external perimeter shaped to receive a tensioning device, such as a spanner, said electrical earthing nut body having opposing generally planar faces;
   at least one threaded aperture on the electrical earthing nut body, extending into the electrical earthing nut body from the electrical earthing nut body perimeter, to receive a bolt to secure an earth connector to the electrical earthing nut body; and
   at least one threaded aperture on the electrical earthing nut body, extending onto the electrical earthing nut body from the electrical earthing nut body perimeter, to receive a grub screw to contact the threaded shaft on which the electrical earthing nut is placed, thereby, in use, immobilizing the electrical earthing nut body with respect to the threaded shaft;

d) at least one raised rib on one planar face to engage a surface against which the nut is to abut.

2. An electrical earthing nut according to claim 1, having at least one raised rib on one planar face to engage a surface against which the electrical earthing nut is to abut.

3. An electrical earthing nut according to claim 1, wherein three, four or more raised ribs are provided.

4. An electrical earthing nut according to claim 1, wherein the outer perimeter of the electrical earthing nut is generally circular with opposing flat portions to receive a spanner.

5. An electrical earthing nut according to claim 1 wherein a raised or extended annulus or flange is defined around the rim or aperture defined on a planar surface of the electrical earthing nut.

6. An electrical earthing nut according to claim 1 wherein a raised or extended annulus or flange is defined around the rim or aperture defined on both planar surfaces of the electrical earthing nut.

7. An electrical earthing nut according to claim 1, wherein three apertures are provided, one to receive the bolt and the other two for receiving grub screw to contact the threaded shaft on which the electrical earthing nut is located.

8. An electrical earthing nut according to claim 7, wherein two apertures are provided adjacent one another in a single face of the perimeter of an hexagonal nut.

9. An electrical earthing nut according to claim 1, wherein the outer perimeter of the electrical earthing nut is polygonal.

10. An electrical earthing nut according to claim 9, wherein the outer perimeter of the electrical earthing nut is hexagonal.

* * * * *

UNITED STATES PATENT AND TRADEMARK OFFICE
CERTIFICATE OF CORRECTION

PATENT NO. : 7,713,071 B2
APPLICATION NO. : 11/660264
DATED : May 11, 2010
INVENTOR(S) : Richard Henry Pearce It is certified that error appears in the above-identified patent and that said Letters Patent is hereby corrected as shown below:

Column 5, line 4-5, "d) at least one raised rib on one planar face to engage a surface against which the nut is to abut" should be deleted.

Signed and Sealed this

Twenty-first Day of December, 2010

David J. Kappos
Director of the United States Patent and Trademark Office